(12) United States Patent
Dilts

(10) Patent No.: US 8,408,637 B1
(45) Date of Patent: Apr. 2, 2013

(54) SUPPORT SYSTEM FOR A TILTABLE STRUCTURE FOR A WORK VEHICLE

(75) Inventor: Brad M. Dilts, Sedgwick, KS (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/545,021

(22) Filed: Jul. 10, 2012

(51) Int. Cl.
*B62D 33/067* (2006.01)

(52) U.S. Cl. ........... 296/190.05; 296/190.06; 180/89.16; 180/89.18

(58) Field of Classification Search ............. 296/190.05, 296/190.06, 190.07, 190.04; 180/89.14, 180/89.13, 89.15, 89.16, 89.119
See application file for complete search history.

(56) References Cited

U.S. PATENT DOCUMENTS

| | | | |
|---|---|---|---|
| 6,910,731 B2 * | 6/2005 | Albright et al. | 296/190.05 |
| 7,959,218 B2 * | 6/2011 | Endou | 296/190.06 |
| 8,096,608 B2 * | 1/2012 | Andou et al. | 296/190.05 |

* cited by examiner

*Primary Examiner* — Joseph Pape
(74) *Attorney, Agent, or Firm* — Sue C. Watson

(57) ABSTRACT

A system for supporting a tiltable structure for a work vehicle including an upper link pivotably connected to a lower link. A connecting link is pivotably connected to the upper link, the connecting link having an engagement member. The upper link, lower link and engagement member securing the tiltable structure in a maintenance position.

20 Claims, 7 Drawing Sheets

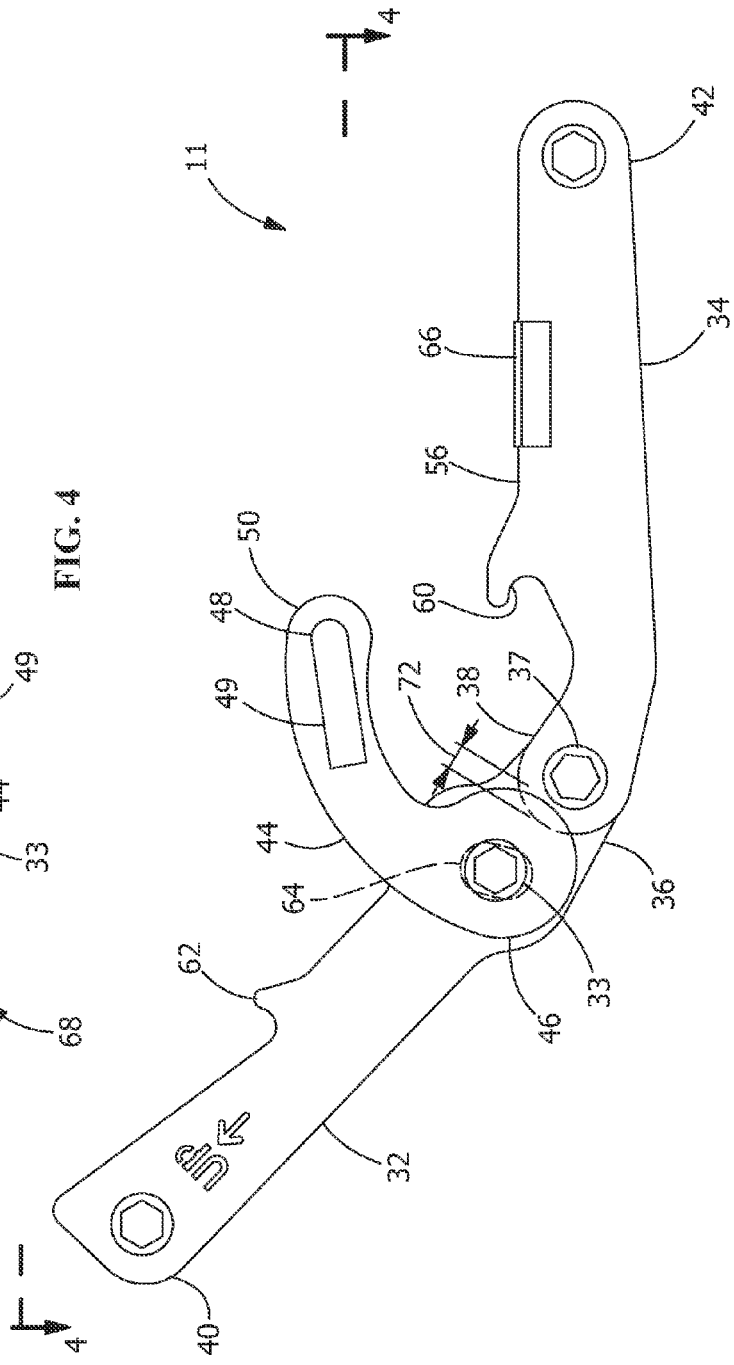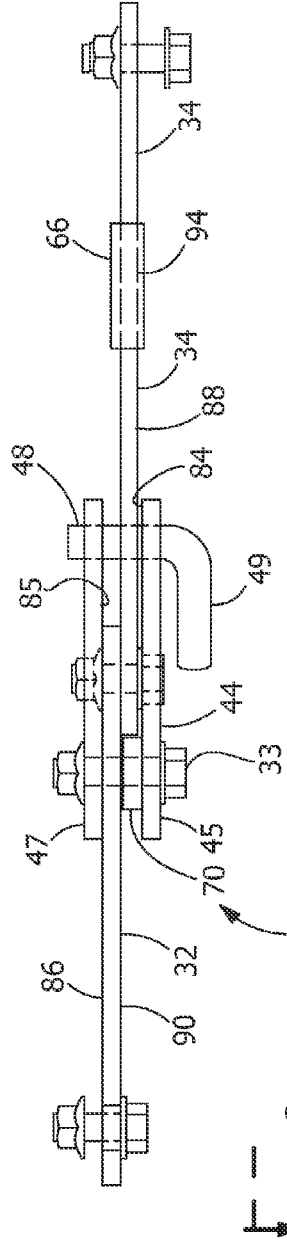

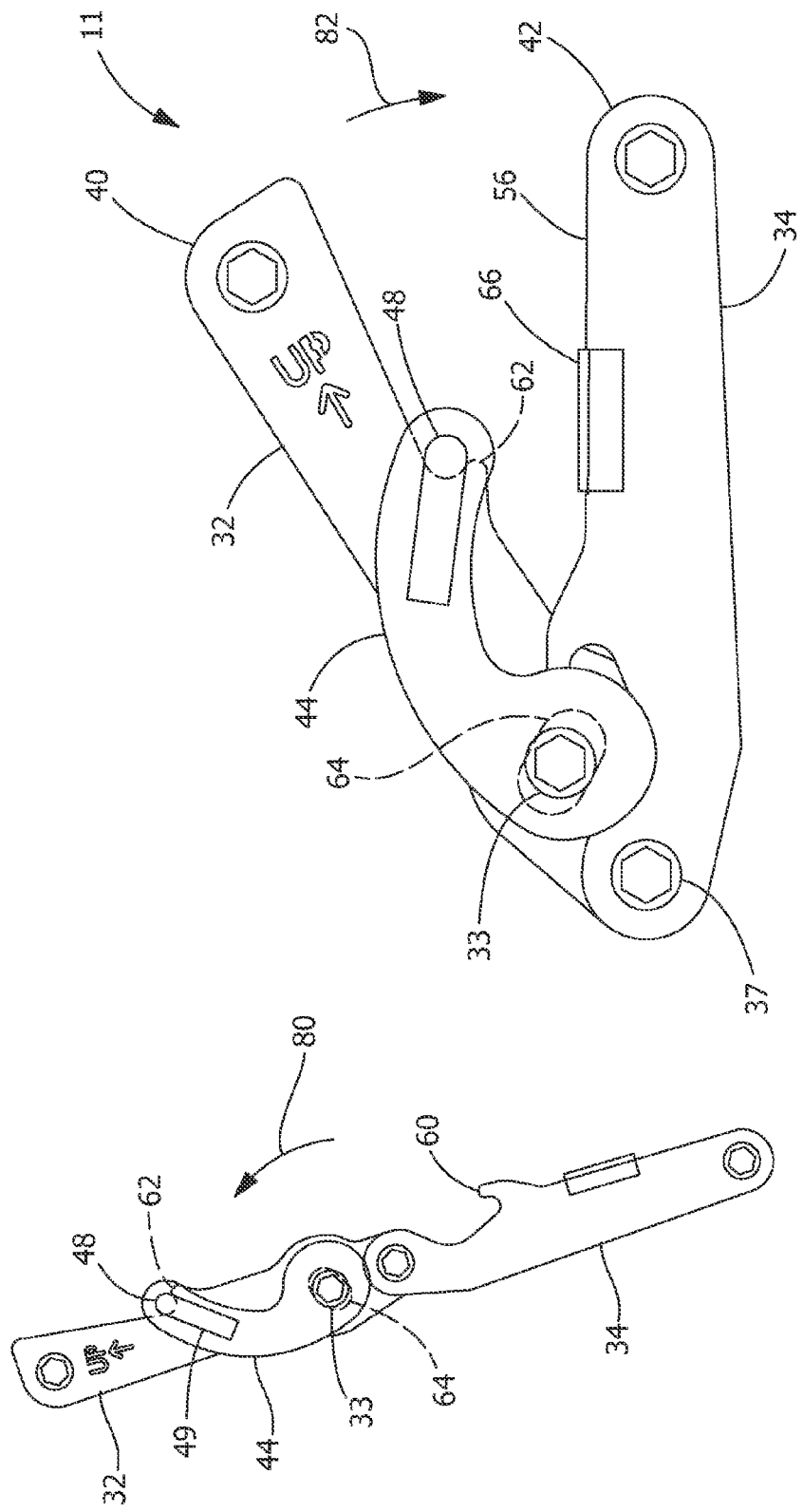

SUPPORT SYSTEM FOR A TILTABLE STRUCTURE FOR A WORK VEHICLE

FIELD OF THE INVENTION

This invention relates generally to a work machine, and more particularly to a work machine having a tiltable structure for protecting an operator.

BACKGROUND OF THE INVENTION

Work machines, such as a skid steer loader typically utilize a structure surrounding the operator and supported by the work vehicle frame for protecting an operator. Since a number of components requiring repair and maintenance are located adjacent to the operator, the protective structure typically can be tilted or rotated to permit access to these components. Conventional systems for preventing inadvertent closure of the tilted protective structure are overly complicated, often requiring components that must be specially installed from the system to secure the structure in the maintenance position, and then subsequently removed to return the protective structure to an operating position.

Accordingly, it would be desirable for a support system for securing the tiltable structure in a maintenance position that does not suffer from the previously mentioned drawbacks.

SUMMARY OF THE INVENTION

The present invention relates to a system for supporting a tiltable structure for a work vehicle including an upper link pivotably connected to a lower link at respective first ends. The upper link has a second end pivotably connected to a tiltable structure, the lower link having a second end pivotably connected to a frame of the work vehicle supporting the tiltable structure. A connecting link having a third end is pivotably connected to the upper link, the connecting link having an engagement member secured near a fourth end opposite the third end. The second ends of the upper and lower links are brought toward each other as the tiltable structure is rotated toward an operating position. The engagement member of the connecting link maintains contact with a contact surface of the lower link as the tiltable structure is rotated about a pivot axis from the operating position toward a maintenance position. The upper link and the lower link are substantially fully extended and prevent the tiltable structure from rotating beyond the maintenance position. Upon the tiltable structure rotatably approaching the maintenance position from the operating position, the engagement member of the connecting link engages a first engagement feature formed along the contact surface of the lower link. Engagement between the engagement member and the first engagement feature prevents the tiltable structure from rotating toward the operating position. Upon sufficient rotation of the connecting link about the third end, the engagement member of the connecting link is disengaged from the first engagement feature and engages a second engagement feature formed in the upper link, permitting rotation of the tiltable structure from the maintenance position toward the operating position. As the tiltable structure approaches the operating position, the engagement member of the connecting link disengages from the second engagement feature and contacts the contact surface of the lower link.

The present invention further relates to a work vehicle including a tiltable structure supported by a frame. An upper link is pivotably connected to a lower link at respective first ends. The upper link has a second end pivotably connected to the tiltable structure, the lower link having a second end pivotably connected to the frame of the work vehicle supporting the tiltable structure. A connecting link having a third end is pivotably connected to the upper link, the connecting link having an engagement member secured near a fourth end opposite the third end. The second ends of the upper and lower links are brought toward each other as the tiltable structure is rotated toward an operating position. The engagement member of the connecting link maintains contact with a contact surface of the lower link as the tiltable structure is rotated about a pivot axis from the operating position toward a maintenance position. The upper link and the lower link are substantially fully extended and prevent the tiltable structure from rotating beyond the maintenance position. Upon the tiltable structure rotatably approaching the maintenance position from the operating position, the engagement member of the connecting link engages a first engagement feature formed along the contact surface of the lower link. Engagement between the engagement member and the first engagement feature prevents the tiltable structure from rotating toward the operating position. Upon sufficient rotation of the connecting link about the third end, the engagement member of the connecting link is disengaged from the first engagement feature and engages a second engagement feature formed in the upper link, permitting rotation of the tiltable structure from the maintenance position toward the operating position. As the tiltable structure approaches the operating position, the engagement member of the connecting link disengages from the second engagement feature and contacts the contact surface of the lower link.

An advantage of the present invention is a simple, reliable system for supporting a tiltable work vehicle structure.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is a side view of an embodiment of a support system.

FIG. 4 is a view taken along line of 4-4 from FIG. 3 of an embodiment of a support system.

FIG. 9 is a side view of an embodiment of a support system corresponding to a tiltable structure in a maintenance position, with the connecting link rotated from a first position toward a second position.

FIG. 10 is a side view of an embodiment of a support system corresponding to a tiltable structure being rotated from a maintenance position toward an operating position.

Wherever possible, the same reference numbers will be used throughout the drawings to refer to the same or like parts.

DETAILED DESCRIPTION OF THE INVENTION

Figure 1:
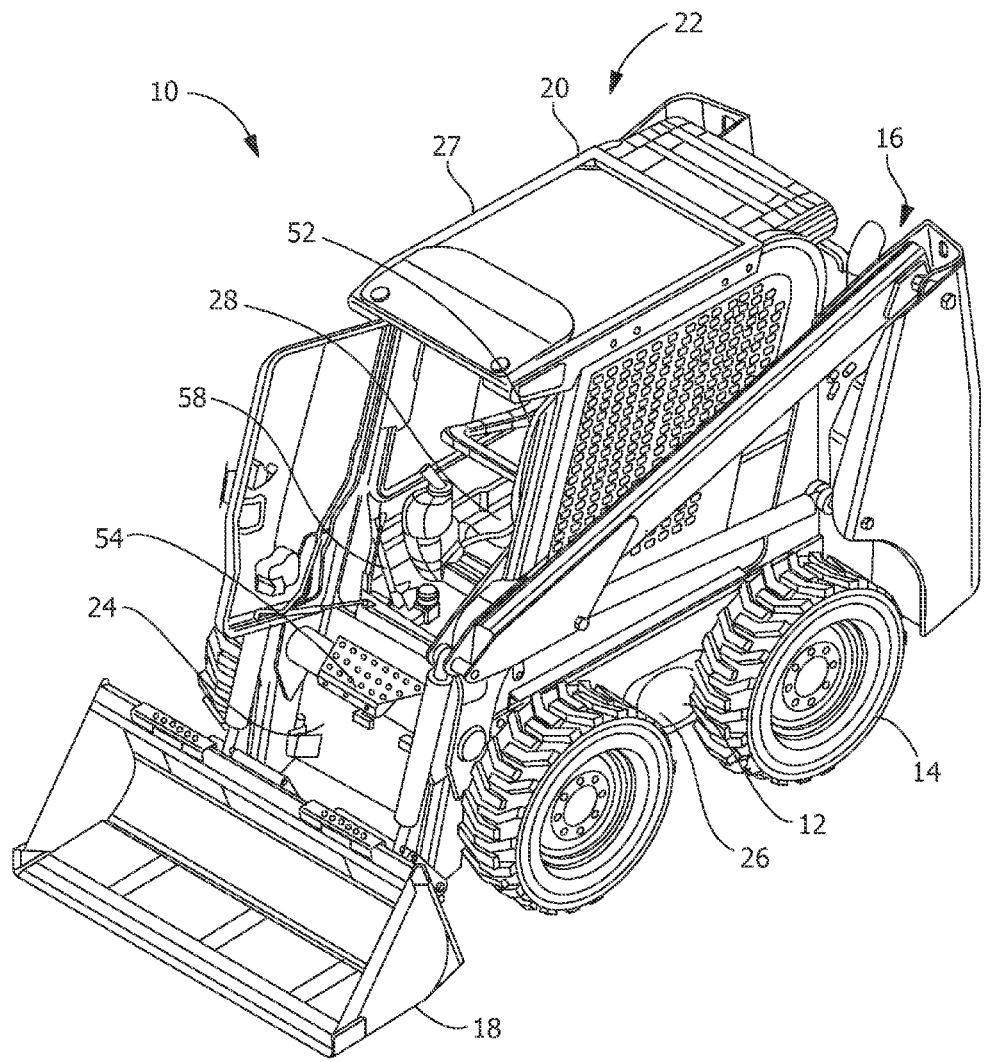
FIG. 1 is an upper perspective view of an embodiment of a work vehicle.
Figure 2:
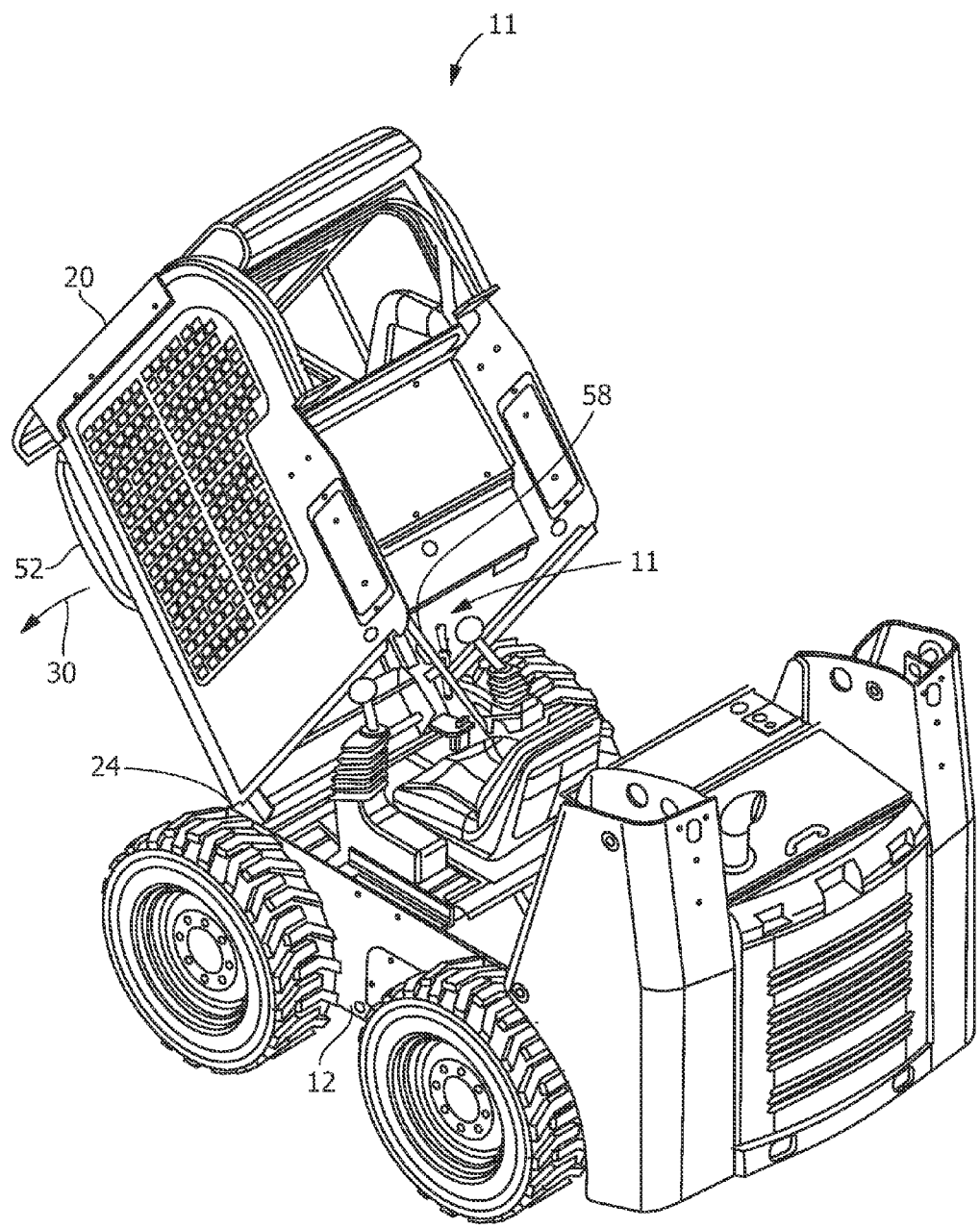
FIG. 2 is a reverse upper perspective view of FIG. 1 of and embodiment of the work vehicle, with a tiltable structure rotated to a maintenance position.

FIG. 1 shows an exemplary work vehicle 10 including a frame 12 that rotatably carries a plurality of wheels 14. A lifting structure 16 including an arrangement of structural members and actuators controllable by an operator (not shown) to manipulate an implement 18 to perform work is also connected to the frame 12. Frame 12 structurally supports a tiltable structure 20 to surround and protect the operator, which frame 12 includes a front end 24 facing implement 18. Tiltable structure 20 may be tilted by rotational movement about a pivot axis (not shown) positioned along front end 24 between an operating position 22 (shown in FIG. 1) and a maintenance position 28 (FIG. 2). Tiltable structure 20 is shown in FIG. 1 in an operating position 22, i.e., resting on frame 12. A strut 58 (FIGS. 1 and 2) extends, providing an opening force along its length to help move tiltable structure 20 from a closed or operating position 22 (FIG. 1) to an open or maintenance position 28 (FIG. 2) and vice versa. In one embodiment, maintenance position 28 represents a rotation of tiltable structure 20 between about 55 to about 60 degrees with respect to the frame 12 as compared to the closed or operating position 22.

To effect cab rotation, in one embodiment, fasteners (not shown) securing tiltable structure 20 to frame 12 are loosened. An operator (not shown) may then place his feet on a step 54 (FIG. 1) disposed on lifting structure 16 and grasp hand rail 52 disposed along a vertical corner of tiltable structure 20 and apply an opening force 30 (FIG. 2). Strut 58 (FIGS. 1 and 2) extends, providing an opening force along its length to help move tiltable structure 20 from a closed or operating position 22 (FIG. 1) to an open or maintenance position 28 (FIG. 2).

FIG. 2 shows a top perspective rear view of the exemplary work vehicle 10 of FIG. 1 with tiltable structure 20 rotated away from frame 12 about pivots positioned along front end 24, with lifting structure 16 removed for clarity. As further shown in FIG. 2, a support system 11 supports and maintains tiltable structure 20 in maintenance position 28 in a manner to be discussed in further detail below.

FIGS. 3 and 4 show orthogonal views of support system 11. Support system 11 includes an upper link 32 pivotably connected to a lower link 34 at respective first ends 36, 38. Upper link 32 includes a second end 40 configured to be pivotably connected to a tiltable structure 20 (FIG. 1). Lower link 34 includes a second end 42 configured to be pivotably connected to a frame 12 (FIG. 1) of work vehicle 10. A connecting link 44 has a third end 46 pivotably connected to upper link 32. As shown in FIG. 3, pivotable connection 33 between third end 46 and upper link 32 includes a slot 64 formed in upper link 32. As further shown FIG. 3, slot 64 is in proximity or in close proximity of first end 36 of upper link 32. Connecting link 44 has an engagement member 48, such as a pin having a handle 49, which engagement member 48 is secured to connecting link 44 near a fourth end 50 opposite third end 46.

Figure 5:
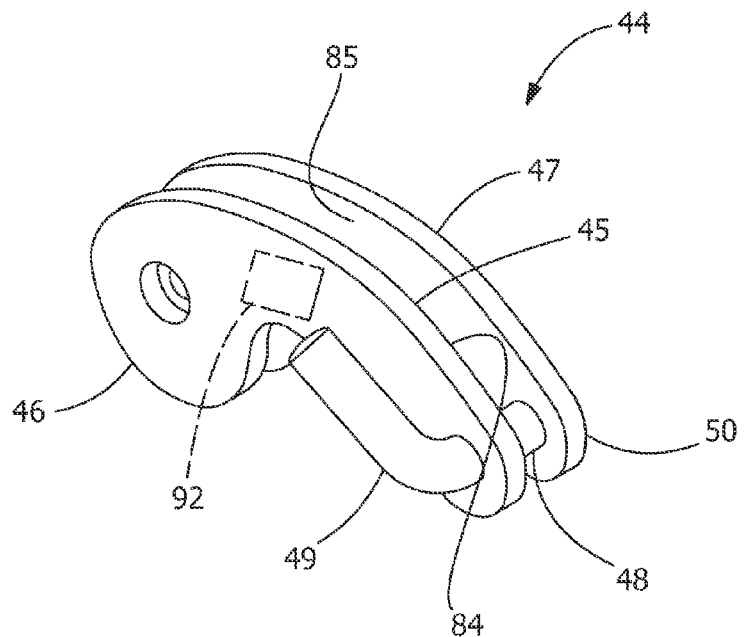
FIG. 5 is an upper perspective view of a connecting link of an embodiment of a support system.

FIGS. 4 and 5 collectively show connecting link 44 including a pair of connecting link portions 45, 47 spaced apart from each other a predetermined distance and secured in position relative to each other by engagement member 48, such as by welding. As shown in FIG. 4, when assembled as part of support system 11, inside surfaces 84, 85 of corresponding connecting links 47, 45 surround and face corresponding outside surfaces 86, 88 of respective upper link 32 and lower link 34. As further shown in FIG. 4, an offset 70 is formed in connecting link portion 45 which is aligned with pivotable connection 33 between connecting link 44 and upper link 32. Offset 70 extends from inside surface 84 of connecting link portion 45 and faces in close proximity surface 90 of upper link 32. At least partially as a result of offset 70 and the proximity of corresponding surfaces of connecting link portions 45, 47 and upper and lower links 32, 34, an alignment feature 68 is formed which substantially eliminates misalignment and binding of upper and lower links 32, 34 while moving relative to one another about pivotable connection 37.

As further shown in FIG. 3, alignment feature 68 further includes an overlap 72 between third end 46 of connecting link 44 and first end 38 of lower link 34 which is maintained throughout the range of rotational movements between each of upper link 32, lower link 34 and connecting link 44. In addition, alignment feature 68 and a contact pad 66 secured to lower link 34 are sized to substantially prevent inadvertent random movement between engagement member 48 of connecting link 44 and contact pad 66. That is, lateral surface 94 of contact pad 66 and surface 84 of connecting link portion 45 are brought together to form a conformal contact and/or a sufficient interference fit. While the conformal contact and/or the sufficient interference fit between these surfaces are insufficient to prevent engagement member 48 of connecting link 44 from making contact with contact pad 66, the conformal contact and/or interference fit are sufficient to substantially prevent inadvertent random movement, i.e., vibration or "rattling" between engagement member 48 and contact pad 66. Additionally, the substantially "comma-shaped" profile of connecting link 44 concentrates center of gravity 92 of connecting link 44 sufficiently near pivotable connection 33 such that the opportunity for vibration or "rattling" between engagement member 48 and contact pad 66 is further reduced.

Figure 6:
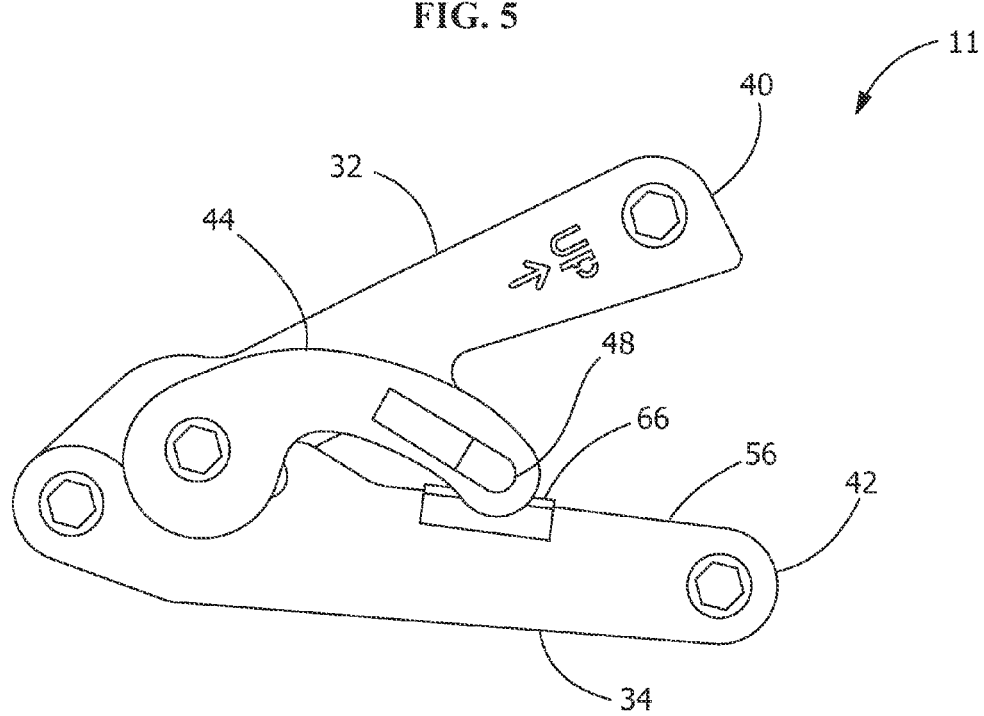
FIG. 6 is a side view of an embodiment of a support system corresponding to a tiltable structure in an operating position.

As shown in FIG. 6, support system 11 is shown in a collapsed or folded position, such as when tiltable structure 20 is in an operating position 22 (FIG. 1). Engagement member 48 is in contact with contact pad 66 which rests on contact surface 56 of lower link 34.

Figure 7:
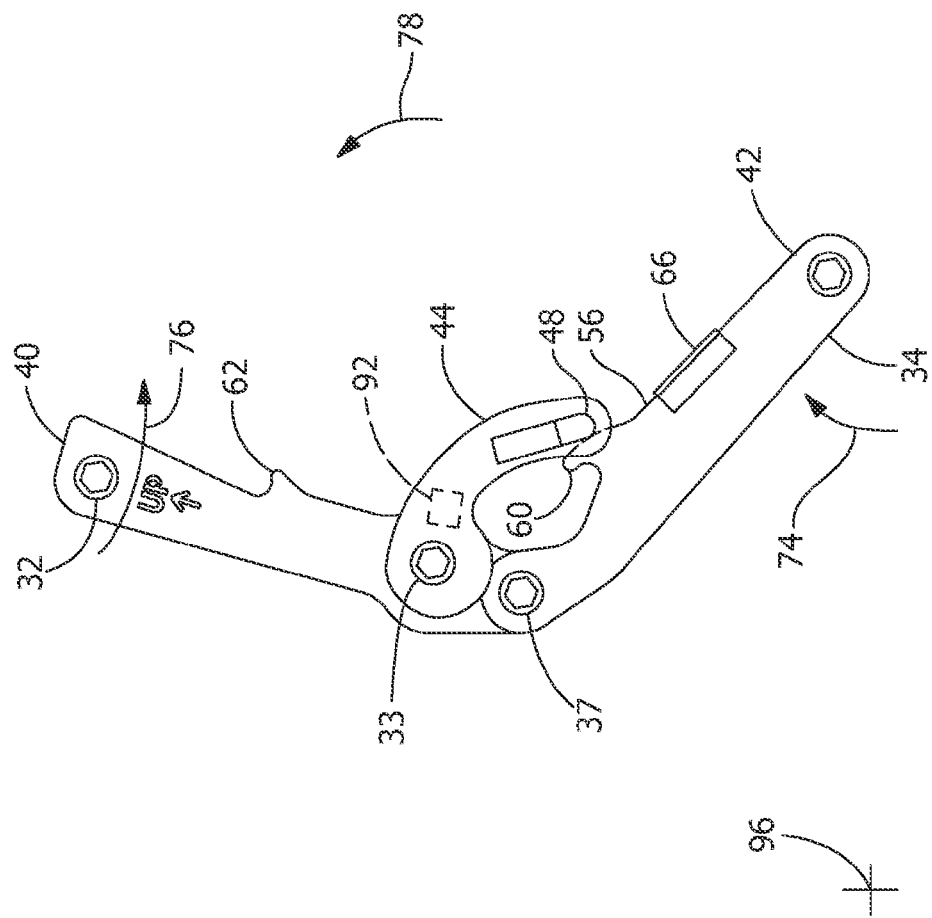
FIG. 7 is a side view of an embodiment of a support system corresponding to a tiltable structure between an operating position and a maintenance position.

As shown in FIG. 7, assisted by strut 58 (not shown) as previously discussed, tiltable structure 20 (not shown) is rotated from operating position 22 toward maintenance position 28 (FIG. 2), as indicated by rotational movement 78. Second end 40 of upper link 32 follows an arc defined by pivot 96 of tiltable structure 20. However, by virtue of pivotable connection 37 between upper link 32 and lower link 34, upper link 32 is urged into rotational movement 76 about second end 40. Similarly, by virtue of a pivotable connection of second end 42 of lower link 34, lower link 34 is urged into rotational movement 74 about second end 42. As a result of connecting link 44 having a center of gravity 92 that is positioned to the right of pivotable connection 33, engagement member 48 is maintained in sliding contact with contact surface 56 of lower link 34.

Figure 8:
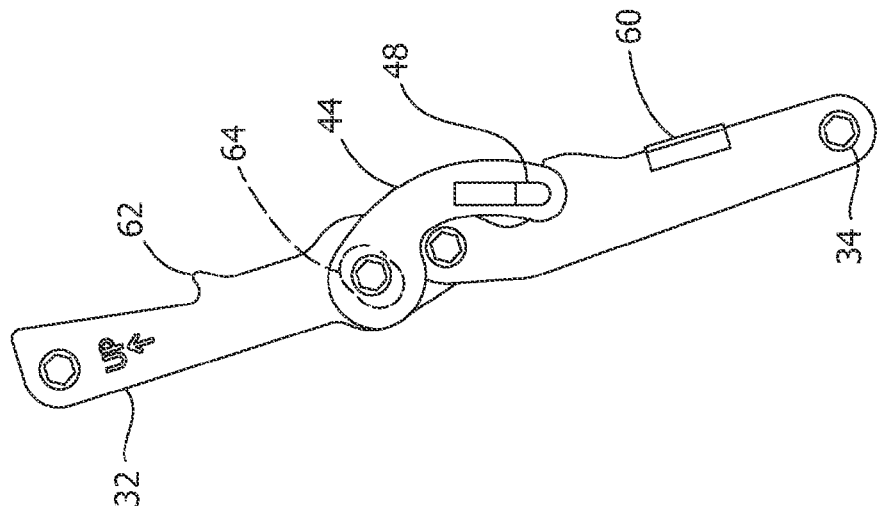
FIG. 8 is a side view of an embodiment of a support system corresponding to a tiltable structure in a maintenance position.

As shown in FIG. 8, as a result of tiltable structure 20 (not shown) reaching maintenance position 28 (FIG. 2), upper and lower links 32, 34 are in a fully extended position. As a result, tiltable structure 20 cannot be further rotated past maintenance position 28. In addition, engagement member 48 of connecting link 44 engages or is secured in first engagement feature 60. As a result of engagement member 48 being secured in first engagement feature 60, tiltable structure 20 also cannot rotate from maintenance position 28 toward operating position 22.

As shown in FIGS. 9-12, upon completion of maintenance/replacement tasks, tiltable structure 20 (not shown) can be returned to operating position 22. To permit rotation of tiltable structure 20 from maintenance position 28 toward operating position 22, as shown in FIG. 9, connecting link 44 is moveable along slot 64 to permit disengagement of connecting link 44 from first engagement feature 60. To simplify manipulation of connecting link 44, engagement member 48 includes handle 49. If strut 58 (not shown) is substantially fully charged, there should be virtually no resistance, other than lifting connecting link 44 such that connecting link 44 slides along slot 64 until engagement member 48 of connecting link 44 becomes disengaged from first engagement feature 60. Once engagement member is disengaged from first engagement feature 60, sufficient rotational movement 80 of connecting link 44 about pivotable connection 33 results in engagement member 48 becoming engaged or secured to second engagement feature 62. Upon release of handle 49 of connecting link 44, by virtue of gravity, pivotable connection 33 of connecting link 44 slides downwardly along slot 64 until engagement member 48 is brought into abutting contact with second engagement feature 62 or pivotable connection 33 is brought into abutting contact with the bottom of slot 64. Upon disengagement of engagement member 48 from first engagement feature 60, tiltable structure 20 may be rotated from maintenance position 28 toward operating position 22. Strut 58 (not shown) provides a force to permit controlled rotational movement of tiltable structure 20 from maintenance position 28 toward operating position 22.

Figure 11:
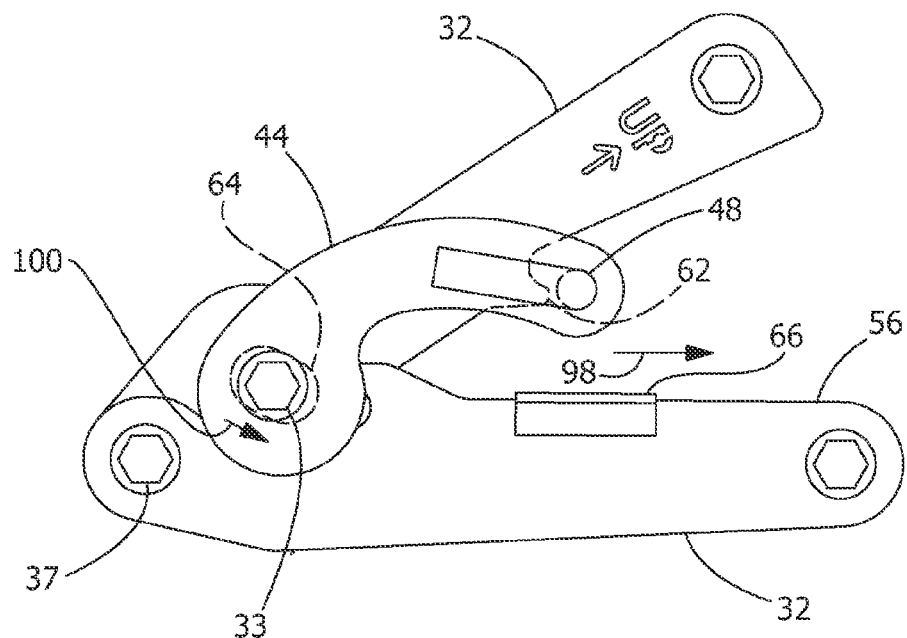
FIG. 11 is a side view of an embodiment of a support system corresponding to tiltable structure being rotated from a maintenance position toward an operating position, with the connecting link becoming disengaged from an upper link.
Figure 12:
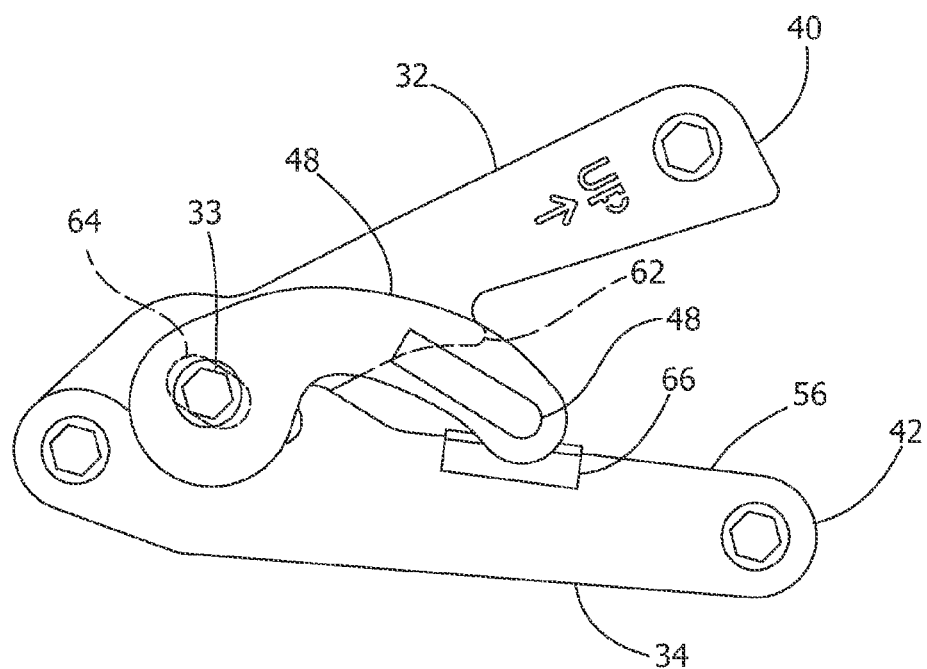
FIG. 12 is a side view of an embodiment of a support system corresponding to tiltable structure located in an operating position.

FIG. 10 shows support system 11 being urged toward a folded position in response to tiltable structure 20 being rotated from maintenance position 28 toward operating position 22. As further shown in FIG. 10, engagement member 48 remains engaged or secured in position by second engagement feature 62. However as shown in FIG. 11, as tiltable structure 20 approaches operating position 22, the arrangement of connecting link 44 relative to second engagement feature 62 reaches a predetermined or "overbalanced" position. As a result of the overbalanced position, gravity urges engagement member 48, which is now in sliding contact with second engagement feature 62, to apply a lateral force 98 sufficient to result in movement 100 of pivotable connection 33 of connecting link 44 along slot 64. Movement 100 of pivotable connection 33 of connecting link 44 along slot 64 continues until engagement member 48 becomes disengaged from second engagement feature 62. As shown in FIG. 12, once engagement member 48 becomes disengaged from second engagement feature 62, gravity continues to urge engagement member 48 into abutting contact with contact pad 66 that is supported by contact surface 56. Upon engagement member 48 achieving abutting contact with contact pad 66, an audible clicking noise is generated, alerting the operator that tiltable structure 20 is in close proximity to the operating position 22. At this point, FIG. 12 and FIG. 6 are virtually identical, and it should be understood that tiltable structure 20 can again be rotated from operating position 22 toward maintenance position 28 in the manner previously discussed. Support system 11 provides a simple, reliable, and virtually automatically operating mechanical arrangement that permits tiltable structure 20 to be moved from operating position 22 to maintenance position 28, and secured at maintenance position 28 until the operator is ready to return tiltable structure 20 to operating position 22. Other than rotating connecting link 44 until engagement member 48 disengages first engagement feature 60 and then engages second engagement feature 62, the support system 11 operates automatically by force of gravity as tiltable structure 20 is rotated from maintenance position 28 to operating position 22.

It is to be understood that in one embodiment, the outline or shape of upper link 32 and lower link 34 may be substantially identical.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for supporting a tiltable structure for a work vehicle, comprising
    an upper link pivotably connected to a lower link at respective first ends, the upper link having a second end pivotably connected to a tiltable structure, the lower link having a second end pivotably connected to a frame of the work vehicle supporting the tiltable structure;
    a connecting link having a third end pivotably connected to the upper link, the connecting link having an engagement member secured near a fourth end opposite the third end;
    the second ends of the upper and lower links being brought toward each other as the tiltable structure is rotated toward an operating position;
    the engagement member of the connecting link maintaining contact with a contact surface of the lower link as the tiltable structure is rotated about a pivot axis from the operating position toward a maintenance position, the upper link and the lower link being substantially fully extended and preventing the tiltable structure from rotating beyond the maintenance position;
    upon the tiltable structure rotatably approaching the maintenance position from the operating position, the engagement member of the connecting link engaging a first engagement feature formed along the contact surface of the lower link, engagement between the engagement member and the first engagement feature preventing the tiltable structure from rotating toward the operating position; and
    upon sufficient rotation of the connecting link about the third end, the engagement member of the connecting link is disengaged from the first engagement feature and engages a second engagement feature formed in the upper link, permitting rotation of the tiltable structure from the maintenance position toward the operating position, and as the tiltable structure approaches the operating position, the engagement member of the connecting link disengages from the second engagement feature and contacts the contact surface of the lower link.

2. The system of claim 1, wherein the connecting link is pivotably connected to a slot formed in the upper link.

3. The system of claim 2, wherein the slot is in proximity to the first end of the upper link.

4. The system of claim 3, wherein when the tiltable structure is in the maintenance position, the connecting link is moveable along the slot to permit disengagement of the connecting link from the first engagement feature.

5. The system of claim 4, wherein when the tiltable structure is in the maintenance position, the connecting link is moveable along the slot to permit engagement of the connecting link with the second engagement feature.

6. The system of claim 5, wherein when the tiltable structure is sufficiently rotated between the maintenance position toward the operating position, the connecting link is moveable along the slot to permit disengagement of the connecting link from the second engagement feature.

7. The system of claim 6, wherein upon disengagement of the connecting link from the second engagement feature, the connecting link establishes contact with the contact surface of the lower link.

8. The system of claim 7, wherein the contact surface of the lower link includes a contact pad.

9. The system of claim 1, wherein the connecting link maintains contact with the contact surface of the lower link due to gravity as the tiltable structure is rotated from the operating position toward the maintenance position.

10. The system of claim 1, wherein the engagement member is a pin.

11. The system of claim 10, wherein the pin includes a handle.

12. The system of claim 1, wherein the connecting link includes an alignment feature.

13. The system of claim 12, wherein the alignment feature comprises an offset formed at the pivotable connection with the upper link.

14. The system of claim 13, wherein the alignment feature comprises the connecting link maintaining an overlap relative to the first end of the lower link between the operating position and the maintenance position.

15. The system of claim 14, wherein the alignment feature and the contact pad are sized to substantially prevent inadvertent random movement between the engagement member of the connecting link and the contact pad of the lower link.

16. The system of claim 15, wherein the center of gravity of the connecting link further helps prevent inadvertent random movement between the engagement member of the connecting link and the contact pad of the lower link.

17. The system of claim 1, wherein the upper link and the lower link are substantially identical.

18. A work vehicle comprising
a tiltable structure supported by a frame;
an upper link pivotably connected to a lower link at respective first ends, the upper link having a second end pivotably connected to the tiltable structure, the lower link having a second end pivotably connected to the frame of the work vehicle supporting the tiltable structure; and
a connecting link having a third end pivotably connected to the upper link, the connecting link having an engagement member secured near a fourth end opposite the third end;
the second ends of the upper and lower links being brought toward each other as the tiltable structure is rotated toward an operating position;
the engagement member of the connecting link maintaining contact with a contact surface of the lower link as the tiltable structure is rotated about a pivot axis from the operating position toward a maintenance position, the upper link and the lower link being substantially fully extended and preventing the tiltable structure from rotating beyond the maintenance position;
upon the tiltable structure rotatably approaching the maintenance position from the operating position, the engagement member of the connecting link engaging a first engagement feature formed along the contact surface of the lower link, engagement between the engagement member and the first engagement feature preventing the tiltable structure from rotating toward the operating position;
upon sufficient rotation of the connecting link about the third end, the engagement member of the connecting link is disengaged from the first engagement feature and engages a second engagement feature formed in the upper link, permitting rotation of the tiltable structure from the maintenance position toward the operating position, and as the tiltable structure approaches the operating position, the engagement member of the connecting link disengages from the second engagement feature and contacts the contact surface of the lower link.

19. The work vehicle of claim 18, wherein the connecting link maintains contact with the contact surface of the lower link due to gravity as the tiltable structure is rotated from the operating position toward the maintenance position.

20. The work vehicle of claim 18, including a contact pad and the connecting link includes an alignment feature, wherein the alignment feature and the contact pad are sized to substantially prevent inadvertent random movement between the engagement member of the connecting link and the contact pad of the lower link.

* * * * *